United States Patent
Gutt et al.

(10) Patent No.: US 8,977,843 B2
(45) Date of Patent: *Mar. 10, 2015

(54) GEOLOCATING NETWORK NODES IN ATTENUATED ENVIRONMENTS FOR CYBER AND NETWORK SECURITY APPLICATIONS

(75) Inventors: Gregory M. Gutt, Ashburn, VA (US);
Arun Ayyagari, Seattle, WA (US);
David A. Whelan, Newport Coast, CA (US); David G. Lawrence, Santa Clara, CA (US)

(73) Assignee: The Boeing Company, Chicago, IL (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/114,013

(22) Filed: May 23, 2011

(65) Prior Publication Data
US 2012/0144451 A1 Jun. 7, 2012

Related U.S. Application Data (63) Continuation-in-part of application No. 12/130,880, filed on May 30, 2008, now Pat. No. 7,952,518.

(51) Int. Cl.
*H04L 29/06* (2006.01)
*H04L 12/701* (2013.01)
(Continued)

(52) U.S. Cl.
CPC .............. *H04L 45/00* (2013.01); *H04L 63/126* (2013.01); *H04L 63/1466* (2013.01); *H04W 4/04* (2013.01); *H04W 12/12* (2013.01); *H04L 67/18* (2013.01); *G01S 5/0289* (2013.01)
USPC ........... 713/153; 713/160; 713/168; 709/223; 709/224; 709/225; 709/226

(58) Field of Classification Search
CPC ....... G01S 5/0289; H04L 45/00; H04L 63/12; H04L 67/18; H04W 4/04
See application file for complete search history.

(56) References Cited

U.S. PATENT DOCUMENTS 6,240,074 B1 * 5/2001 Chandos et al. .............. 370/321
6,725,276 B1 * 4/2004 Hardjono et al. ............. 709/238
(Continued)

OTHER PUBLICATIONS

International Search Report, Application Ser. No. PCT/US2012/035281, Jul. 23, 2012.
(Continued)

*Primary Examiner* — Dede Zecher
*Assistant Examiner* — Trang Doan
(74) *Attorney, Agent, or Firm* — Vista IP Law Group LLP; Cynthia A. Dixon (57) ABSTRACT

A system and method for verifying and/or geolocating network nodes in attenuated environments for cyber and network security applications are disclosed. The system involves an origination network node, a destination network node, and at least one router network node. The origination network node is configured for transmitting a data packet to the destination network node through at least one router network node. The data packet contains a security signature portion, a routing data portion, and a payload data portion. The security signature portion comprises a listing of at least one network node that the data packet travelled through from the origination network node to the destination network node. In addition, the security signature portion comprises geolocation information, identifier information, and timing information for at least one network node in the listing.

28 Claims, 7 Drawing Sheets

(51) Int. Cl.
*H04W 4/04* (2009.01)
*H04W 12/12* (2009.01)
*H04L 29/08* (2006.01)
*H04L 9/32* (2006.01)
*G06F 15/173* (2006.01)
*G01S 5/02* (2010.01)

(56) References Cited

U.S. PATENT DOCUMENTS

| | | | |
|---|---|---|---|
| 7,042,392 B2 | 5/2006 | Whelan et al. | |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 7,797,543 B1* | 9/2010 | Campbell et al. | 713/178 |
| 2002/0068584 A1 | 6/2002 | Gage et al. | |
| 2002/0143855 A1* | 10/2002 | Traversat et al. | 709/202 |
| 2003/0061481 A1* | 3/2003 | Levine et al. | 713/163 |
| 2005/0059409 A1* | 3/2005 | Vare et al. | 455/456.1 |
| 2005/0074033 A1 | 4/2005 | Chauveau | |
| 2005/0094640 A1* | 5/2005 | Howe | 370/395.1 |
| 2005/0159891 A1 | 7/2005 | Cohen et al. | |
| 2006/0178918 A1* | 8/2006 | Mikurak | 705/7 |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2008/0153509 A1* | 6/2008 | Piekarski | 455/456.2 |
| 2009/0174597 A1 | 7/2009 | DeLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2010/0090822 A1* | 4/2010 | Benson et al. | 340/508 |
| 2010/0171652 A1 | 7/2010 | Gutt et al. | |
| 2011/0225424 A1* | 9/2011 | Zee et al. | 713/171 |

OTHER PUBLICATIONS

Kent BBN Technologies S: "IP Authentication Header; rfc4302.txt", Dec. 1, 2005, XP015043221, ISSN: 0000-0003, the whole document.

\* cited by examiner

FIG. 4B $$sbr = \begin{Bmatrix} A & B & C & D \\ 10 & 2 & .5 & 0 \\ 3 & 11 & 2.5 & 0 \\ .2 & 1.5 & 12 & 0 \end{Bmatrix} \begin{matrix} \\ Beam\ 1 \\ Beam\ 2 \\ Beam\ 3 \end{matrix}$$

GEOLOCATING NETWORK NODES IN ATTENUATED ENVIRONMENTS FOR CYBER AND NETWORK SECURITY APPLICATIONS

CROSS-REFERENCE TO RELATED APPLICATIONS

This application is a Continuation-In-Part application of, and claims the benefit of U.S. patent application Ser. No. 12/130,880, filed May 30, 2008 now U.S. Pat. No. 7,952,518, which is hereby incorporated by reference in its entirety. This application is related to U.S. patent application Ser. No. 13/073,830, filed Mar. 28, 2011, and U.S. patent application Ser. No. 12/949,404, filed Nov. 18, 2010, which are both hereby incorporated by reference in their entirety. This application is related to U.S. patent application Ser. No. 13/586,705, filed Aug. 15, 2012, wich issued as U.S. Pat. No. 8,769,267 on Jul. 1, 2014.

BACKGROUND

The present disclosure relates to geolocating network nodes. In particular, it relates to geolocating network nodes in attenuated environments for cyber and network security applications.

SUMMARY

The present disclosure relates to a method, system, and apparatus for verifying and/or geolocating network nodes in attenuated environments for cyber and network security applications. In particular, the present disclosure teaches a system involving an origination network node and a destination network node. The system further involves at least one router network node. Further, the system involves the origination network node and the destination network node being connected to each other via at least one router network node. Also, the system involves the origination network node being configured for transmitting a data packet to the destination network node through at least one router network node. In addition, the system involves the data packet containing a security signature portion, a routing data portion, and a payload data portion.

In one embodiment, this method can be adopted for existing infrastructure; however, it requires additional effort given the internet engineering task force (IETF) internet protocol (IP) Networking protocols and their implementations in routers. For the existing deployed infrastructure, an inter-related router network using enabled hardware is used for a management control plane signaling that may effectively allow tracking and tracing methods to be performed for specific classes of traffic, while allowing normal data plane traffic to take the standard existing fast path forwarding. For example, a specific control plane network management packet that has a known route can be inserted that has the same route as a particular class of data plane IP network traffic between the same peer routers. This allows a solution to be developed using elements such as appropriate analytics, such as an event correlation engine for network attribution and a decision support engine, which may be deployed on existing and future deployed infrastructures on the control plane while being fully compliant with IETF RFCs. The elements that are listed, which the data packets would contain, would now be conveyed via the control plane data and data plane flows and can be assumed to be following the current processing and forwarding mechanisms.

In one or more embodiments, the security signature portion comprises a digital signature. In some embodiments, the security signature portion comprises a listing of at least one network node that the data packet travelled through from the origination network node to the destination network node. In at least one embodiment, the security signature portion comprises timing information for at least one network node in the listing indicating when the data packet was received and/or transmitted by the network node(s). In some embodiments, the security signature portion comprises identifier information for at least one network node in the listing. In one or more embodiments, the identifier information is biometric information and/or a bit sequence identification code.

In at least one embodiment, the security signature portion comprises geolocation information for at least one network node in the listing. In one or more embodiments, the geolocation information is obtained by the network node receiving a resultant signal that is transmitted from at least one transmission source. The resultant signal contains at least one authentication signal. The network node location is verified by comparing properties of the resultant signal the network node receives to expected properties of the resultant signal that the network node should receive due to its location. In some embodiments, at least one transmission source is a satellite, a pseudo-satellite, and/or a terrestrial transmission source. In at least one embodiment, the satellite is a low Earth orbiting (LEO) satellite, a medium Earth orbiting (MEO) satellite, or a geosynchronous Earth orbiting (GEO) satellite.

In at least one embodiment, in lieu of geolocation data being appended to every data packet, a secure network server could be used to periodically validate the location of the enabled participating routers. End users with enabled devices could verify the routing path by periodically checking with the secure network server to confirm the location of the routers in the path. As each router may have its own key, as long as the keys have not been compromised, this could be used in lieu or in combination of adding geolocation data to every packet.

In one or more embodiments, the disclosed system employs an Iridium LEO satellite constellation, where each of the satellites in the constellation has an antenna geometry that transmits forty-eight (48) spot beams with a distinctive spot beam pattern. In at least one embodiment, at least one authentication signal may be transmitted from at least one of the Iridium satellites in the constellation. The forty-eight (48) spot beams of an Iridium satellite may be used to transmit localized authentication signals to network nodes located on or near the Earth's surface. The broadcasted message burst content associated with these authentication signals includes pseudorandom noise (PRN) data. Since a given message burst may occur within a specific satellite spot beam at a specific time, the message burst content including PRN and unique beam parameters (e.g., time, satellite identification (ID), time bias, orbit data, etc.) may be used to authenticate the location of the network nodes. It should be noted that when employing one of the above-described Iridium LEO satellites, the transmission signal power is sufficiently strong enough to allow for the signal to penetrate into an indoor environment. This allows for the disclosed system to be used for many indoor applications for authentication technologies.

In one or more embodiments, the geolocation information is determined from ranging information obtained by a signal transmitted by the network node to another network node at a verified location and a signal received by the network node from the network node at the verified location. In at least one embodiment, the disclosed system utilizes the principles of network level ranging for Internet IP traffic on a per Quality of Service (QoS) flow basis. In at least one embodiment, the routing data portion contains routing information for the data packet, where the routing information includes information regarding the destination network node that the data packet is to be sent. In one or more embodiments, the payload data portion includes the data that is to be transmitted from the origination network node to the destination network node.

In at least one embodiment, a method for verifying and/or geolocating network nodes in attenuated environments for cyber and network security applications involves transmitting, with an origination network node, a data packet to a destination network node through at least one router network node. The origination network node and the destination network node are connected to each other via at least one router network node. The data packet contains a security signature portion, a routing data portion, and a payload data portion.

In one or more embodiments, a network node device for cyber and network security applications involves a receiver and a processor. The receiver is capable of receiving a signal from a signal source. The processor is able to append information related to the signal as a security signature onto data packets that are routed through the network node device.

In at least one embodiment, an authentication system for cyber and network security applications involves a network node device and a processing device. The network node device comprises a receiver that is capable of receiving a signal from a signal source, and a processor that is able to append information related to the signal as a security signature onto data packets that are routed through the network node device. The processing device is able to compare the security signature of the data packets being routed through the network node device to known information related to the signal that the network node device received to authenticate the network node device.

In one or more embodiments, authentication of the network node device is at least partly comprised of determining if the network node device is physically located in its anticipated geographic location. In at least one embodiment, the network node device is authenticated before data is authorized to be passed. In some embodiments, the processing device is a cell phone, a personal digital assistant (PDA), a personal computer, a computer node, an internet protocol (IP) node, a server, a Wi-Fi node, and/or a tethered or untethered node.

Additionally, the present disclosure relates to a method, system, and apparatus for using guard spot beams for authenticating the location of a network node. In particular, the present disclosure teaches a method for a transmission-based authentication system to verify geolocation information for a network node. In one or more embodiments, the disclosed method involves transmitting, from at least one transmission source, an authentication signal and at least one guard signal. The method further involves receiving, from at least one receiving source, at least one resultant signal. At least one resultant signal includes the authentication signal and/or at least one guard signal. In addition, the method further involves authenticating, with at least one authenticator device, at least one network node by evaluating at least one resultant signal that the network node(s) receives from at least one receiving source. In at least one embodiment, at least one network node is utilized by an entity and/or a user.

In one or more embodiments, the authentication signal and at least one guard signal are transmitted from the same transmission source. In at least one embodiment, the authentication signal and at least one guard signal are transmitted from different transmission sources. In some embodiments, the authentication signal and at least one guard signal are transmitted on the same frequency. In alternative embodiments, the authentication signal and at least one guard signal are transmitted on different frequencies.

In at least one embodiment, data transmitted by at least one guard signal is used for a legitimate purpose. In one or more embodiments, at least one guard signal at least partially includes an authentication signal. In various embodiments, the guard signal may include an authentication signal and/or data, which may be legitimate or false. In some embodiments, data transmitted by at least one guard signal includes localized information and/or regional information.

In one or more embodiments, data transmitted by the guard signal can be received by a network node that is located within an overlap area of the signals. In some embodiments, the data is transmitted via at least two out-of-phase binary phase shift keying (BPSK) signals, where the out-of-phase BPSK signals appear to be at least one quadrature phase shift keying (QPSK) signal. In at least one embodiment, a changing of the modulation of the bit stream of at least one guard signal modifies the broadcast power of the bits in the bit stream on a bit by bit basis. In some embodiments, when at least two guard signals are transmitted, a relative power of the guard signals is varied such that the guard signals located closer to the authentication signal have a higher power than the guard signals located further from the authentication signal.

Additionally, the present disclosure teaches a transmission-based authentication system to verify geolocation information for a network node. In one or more embodiments, the disclosed system involves at least one transmitter, at least one receiver, and at least one authenticator device. In one or more embodiments, at least one transmitter transmits an authentication signal and at least one guard signal; and at least one receiver receives at least one resultant signal. At least one resultant signal includes the authentication signal and/or at least one guard signal. In at least one embodiment, at least one authenticator device authenticates at least one network node by evaluating at least one resultant signal that at least one network node receives from at least one receiver. It should be noted that, in one or more embodiments, the system also includes a cyber locate portal. The cyber locate portal is a secure interface between the network and the authenticator device that adds an additional level of security to the system. In these embodiments, the resultant signal is sent to the authenticator device for authentication via the cyber locate portal.

In one or more embodiments, the authentication data is encrypted to avoid being intercepted and re-used. Additionally, the data may be signed with a signature, which can be used to confirm the data originated from a specific portal device by comparing the signature of the data to the signature for that specific portal device. Each cyber locate portal device may have a unique key for encrypting, and may have an additional key for signing the sample data. These keys would optimally only be known by the authentication server and the portal device.

In at least one embodiment, at least one receiver and at least one transmitter are incorporated together in at least one transceiver. In some embodiments, the authentication signal and at least one guard signal are transmitted from the same transmitter. In at least one embodiment, the authentication signal and at least one guard signal are transmitted from different transmitters. In one or more embodiments, at least one authenticator device includes a server and/or a processor. In some embodiments, the authentication signal and at least one guard signal are transmitted on the same frequency.

In at least one embodiment, at least one authenticator device operates at least part of a host network. In one or more embodiments, the disclosed system further comprises a host network that operates as an intermediary between at least one network node and at least one authenticator device. In some embodiments, at least one receiver is employed in a cell phone, a personal digital assistant (PDA), a personal computer, a computer node, an internet protocol (IP) node, a server, a wi-fi node and/or a tethered or untethered node.

In some embodiments, the receiver may also encompass the functionality of a cyber locate portal device. In some embodiments, the receiver and the cyber locate portal device are combined in a cell phone or PDA. Note that if a cell phone or PDA includes the cyber locate portal device, the signal processing, encryption, and signature functions may ideally be performed in hardware and/or firmware that are not part of the operating system of the cell phone or PDA. For example, optionally, the encryption and signature keys as well as the unencrypted sample data are not accessible by the cell phone or PDA operating system.

In one or more embodiments, at least one transmitter is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite. In one or more embodiments, at least one network node is stationary and/or mobile. In at least one embodiment, at least one authenticator device is a peer device.

In one or more embodiments, a method for a transmission-based authentication system involves transmitting, from at least one transmission source, a plurality of authentication signals. The method further involves receiving, from at least one receiving source, a resultant signal that includes at least two of the authentication signals. Further, the method involves authenticating, with at least one authenticator device, at least one network node by comparing properties of the resultant signal the network node(s) receives from the receiving source location(s) to expected properties of the resultant signal that the network node(s) should receive from the receiving source location(s).

In one or more embodiments, a system and method for a transmission based authentication system involve transmitting, from at least one transmission source, a plurality of authentication signals in spot beams, where each spot beam contains one authentication signal. In at least one embodiment, the transmission source(s) is employed in at least one LEO satellite from an Iridium satellite constellation. In some embodiments, the authentication signals are transmitted on the same frequency. The method further involves receiving, from at least one receiving source, a resultant signal that includes at least two of the authentication signals. Further, the method involves authenticating at least one network node by comparing properties of the resultant signal the network node(s) receives from the receiving source location(s) to expected properties of the resultant signal that the network node(s) should receive from the receiving source location(s).

In at least one embodiment, the authentication signals are transmitted from the same transmission source. In alternative embodiments, the authentication signals are transmitted from the different transmission sources. In some embodiments, the transmission source(s) is employed by at least one satellite and/or at least one pseudo-satellite. In one or more embodiments, the authentication signals are transmitted on the same frequency and at the same time, and each authentication signal has a different modulation than the other authentication signals. In at least one embodiment, the different modulations are different pseudorandom digital modulation sequences. In some embodiments, the different pseudorandom digital modulation sequences are different BPSK code sequences.

In one or more embodiments, the properties that are compared are signal power, doppler shift, time of arrival, and/or signal modulation. In particular, the received signal modulation is the combination of a plurality of authentication signals, and this resultant combined modulation has characteristics that will change with the receiving source's location. In some embodiments, the disclosed system and method relate to network security for networks including, but not limited to, self-forming, peer-to-peer, and/or ad hoc networks.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for geolocating network nodes. Specifically, this system relates to geolocating network nodes in attenuated environments for cyber and network security applications, such as for authentication and/or for authorization of network nodes. In particular, the present disclosure teaches participating network nodes, or other junctions in the network chain, that tag transmitted data packets with appending authentication data. This authentication data has a specific data packet structure, which includes unique data such as security signature data, routing data, and/or payload data. The security signature data includes information regarding the location of the participating network nodes in the network chain and may also include information regarding whether their location has been verified.

Currently, cyber-security is becoming increasingly important as electronic systems become more engrained into everyday business and social tasks. Many previously managed business processes have expanded into electronic data processing online, which has made on-going information and computing security advancement techniques a necessary requirement in order to protect these everyday-used systems. Critical documents and other data using information from social security numbers to national infrastructure related information are stored in networked systems that if accessed by an unauthorized party would have varying degrees of societal impact from nuisances to catastrophic societal infrastructure breakdown. In parallel with increased reliance on electronic systems, the nation has also seen a dramatic increase in terrorism and computer hacking; thus requiring society to work towards improving methods to protect our networked computer systems.

Cyber attacks and network penetrations are becoming all too common. These frequent occurrences have brought discussions of dangers of network penetrations by external threats in both commercial and military environments to the forefront. Current access control approaches are principally based on either static passwords, or are authentication based using passwords and smart badge credentials based on Public Key Infrastructure (PKI). As system attacks are often conducted by impersonating the end user, there has been a tendency for organizations to focus on user authentication methods to curtail network data interception network vulnerabilities. These approaches continue to be vulnerable to sophisticated attacks and, thus, a need has developed for a new paradigm of access control leveraging additional dimension/information beyond the normal three dimensions (what you know, what you have, and who you are) of authentication by adding the geospatial location/context, such as user location, to provide an additional and orthogonal layer of protection, which provides an enhanced correlation between location and context awareness from integrated physical geolocation mapping to logical network and information management views.

Furthermore, the fact that existing cyber attacks are often shrouded in anonymity has created additional concerning problems. Larger attacks are often precluded by attempts of the originator to make small intrusions/attacks to better understand the system's vulnerabilities for future exploitation and laying the groundwork for a later, more destructive attack. To date, many large scale cyber attacks have not only left the recipients of the attacks still recovering from the damage left behind, but the recipients are also unable to deter any further damage through retaliation, or otherwise, as without having a clear traceability to the attack's originator and, thus, often lack the authority to respond. If attack motives are unclear, it is further unlikely that the recipient could tell if the attack was a mere act of vandalism, a purposeful theft, or a more sinister approach to threaten national security. As such, any system that would aid in denying network access to rogue users and/or provide traceable data to aid in identifying the originator would have great utility to reduce and mitigate denial of service (DoS) and network data interception attacks.

The present disclosure relates generally to networked systems that benefit from cyber security. More specifically, the system of the present disclosure leverages at least one self-geolocating network node to employ a signature packet structure that may allow for the data packet to be traceable back to a specific network node at a defined point in time. This signature packet structure can be used to improve cyber security in participating networks. As an example, a signature packet structure may include elements such as payload data, routing data, and/or security data. The security data may be defined as geolocation data, biometrics data, and/or timing data. In at least one embodiment, this signature packet structure collectively may be referred to as the cyber security signature when being used for cyber security applications. For example, a file may be transmitted from one user to another user through a connection such an email transmitted through the internet. Participating network nodes, or other sort of junctions, in the network chain may tag the data with appending authentication data, which may include elements of the signature packet structure (e.g., payload data, routing data, and/or security data). As the data packet moves to the next junction in the network chain, the network junction may authenticate it. Authentication may occur when the physical location as represented through the geolocation data is validated against the known network node location.

The present disclosure may be used to provide access to a networked system as well as to restrict access to such a system. In at least one embodiment, it is envisioned that networks leveraging this form of cyber security may require such cyber security signature data in order to accept data packets. It is through this means that rogue users may be identified prior to entering the system as the signature is virtually unspoofable, or that man-in-the-middle or other similar attacks are recognized as discrepancies in the signature data. In at least one embodiment, the system may incorporate existing trace back methods, such as constraining the number of node hops (i.e., numerical counter Time to Live (TTL)). This invention may introduce a paradigm shift (i.e., Internet 3.0) in terms of cyber security, which could lead to its adoption by the masses for hardware and/or software that is able to support a signature packet data structure.

The system of the present disclosure may be adapted for networked systems that include wired and/or wireless network nodes. In at least one embodiment, at least one network node uses at least one satellite to geolocate. In one example, a self-geolocating network node may use a low Earth orbiting (LEO) constellation that is enabled to provide a signal that can be received indoors. This system may or may not be used in combination with global positioning system (GPS) or any other system used for positioning, navigation, and/or timing. In addition, the system of the present disclosure may employ biometrics in order to validate a user/node by something inherent to the user/node, as well as employ any other authentication method that when used in combination with the described methods will improve the overall security of the system.

The system of the present disclosure has four main features. The first main feature of the system is that teaches a self-geolocating networking device (e.g., a self geolocating server, router, personal computing device, cell phone, and/or television) that has many applications, including general cyber security and authentication; but may also be used in other applications such as gaming.

The second main feature of the disclosed system is that it teaches a data packet structure that enables authentication and cyber security. The data packet structure enables a means to trace the data packet back to network nodes that were part of the series of junctions used for the packet to get to its destination location. This signature packet structure can be used to improve cyber security in participating networks. As an example, a signature packet structure may include elements such as payload data, routing data, and/or security data. The security data may be defined as geolocation data, biometrics data, and/or timing data. In at least one embodiment, this signature packet structure collectively may be referred to as the cyber security signature if used for cyber security applications.

The third main feature of the disclosed system is that it teaches elements of the signature packet structure that are unique. Participating network nodes, or other sort of junctions, in the network chain may tag the data with appending authentication data, which may include elements of the signature packet structure (i.e., payload data, routing data, and/or security data). The participating network nodes act similar to touch DNA from a fingerprint in terms of traceability as each router that the data packet utilizes provides some traceable data to the signature. As the data packet moves to the next junction in the network chain, it will accumulate, for example, small bit sequences and each subsequent junction may authenticate it. This accumulation of small bit sequences can lead to a statistically compelling fingerprint of the network path. Authentication may occur by comparing the network latencies for the anticipated network path (along with their corresponding unique appended data) to the signature data packet and anticipated network latency acceptable ranges. Additionally, other network parameters may be monitored to validate that a man-in-the-middle (MITM) attack is not underway. In one embodiment, if a MITM attack is suspected, the network may be configured to respond based on the network's policy.

The fourth main feature of the disclosed system is that the system employs the use of at least one LEO satellite to transmit a signal to the network nodes. The LEO satellite signal is able to penetrate into an indoor environment due to its higher received power at the receiver. As such, this feature allows for the disclosed system to be used for many indoor applications for authentication technologies.

Additionally, it should be noted that the disclosed system can be used for a variety of applications where it is desirable to confirm, trace, monitor, and/or track the location of a "node". In addition, the system may provide additional utility to existing tracking methods for credit cards, especially since payment options are currently being more integrated into personal portable devices, such as cellular telephones. Not only could the location of a user of a credit card be monitored, but the user could potentially be tracked to be re-located for the case of trying to retrieve a stolen item from the user. Also, it should be noted that this feature may be used in combination with personal computing devices for gaming, such as for geo-caching.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
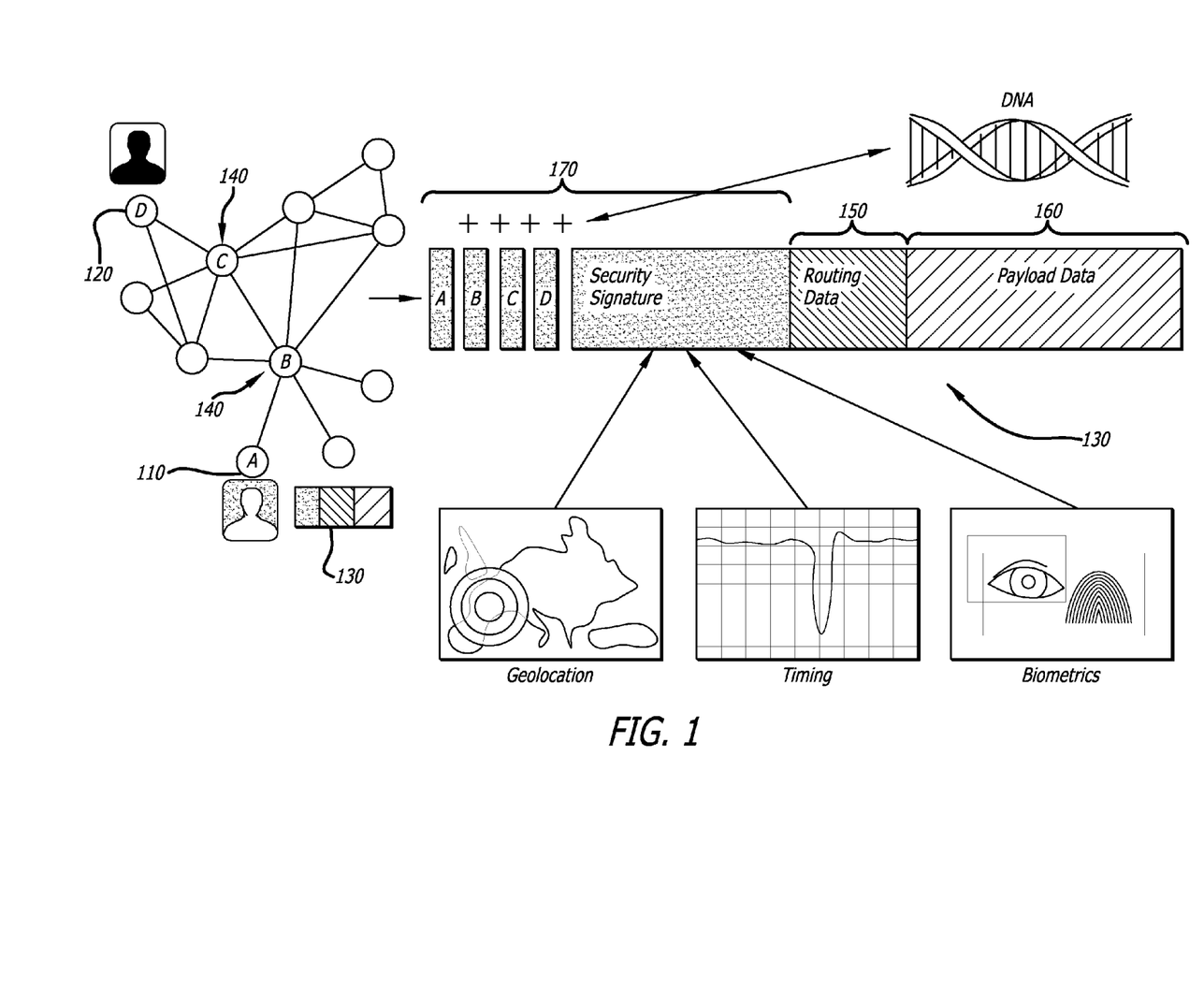
FIG. 1 illustrates an embodiment of the disclosed system for geolocating network nodes in attenuated environments for cyber and network security applications.

FIG. 1 illustrates an embodiment of the disclosed system 100 for geolocating network nodes in attenuated environments for cyber and network security applications. In this figure, a user located at origination network node (Node A) 110 wishes to transmit a data packet 130 to a user located at destination network node (Node D) 120. The origination network node (Node A) 110 and the destination network node (Node D) 120 are connected to each other via a plurality of router network nodes 140, which include Node B 140 and Node C 140. The origination network node (Node A) 110 is shown to transmit the data packet 130 to the destination network node (Node D) 120 through router network nodes Node B 140 and Node C 140.

The data packet 130 contains a security signature portion 170, a routing data portion 150, and a payload data portion 160. The routing data portion 150 of the data packet 130 contains routing information for the data packet 130. The routing information includes information regarding the destination network node (e.g., the address for the destination network node (Node D) 120) that the data packet 130 is to be sent. The payload data portion 160 of the data packet 130 contains the data and/or information that the user at the origination network node (Node A) 110 wants to send to the user at the destination network node (Node D) 120. The security signature portion should be unable to be copied from one packet and pasted into another packet, otherwise the essence of the invention would be compromised as it would be possible to make another packet appear as though it has followed the same route as the first. This may be applied differently in various embodiments. In one embodiment, the security signature may be a function of the payload data. For example, the security signature could include a component that is a digital signature, which may be a function of the payload data. These digital signatures could be accumulated along the route or could be validated as having come from the last participating router and replaced with a new digital signature at each hop.

The security signature portion 170 of the data packet 130 includes a listing of all of the network nodes that the data packet 130 travelled through from the origination network node (Node A) 110 to the destination network node (Node D) 120. As shown in this example, the listing of network nodes in the security signature portion 170 includes Node A 110, Node B 140, Node C 140, and Node D 120. As the data packet 130 travels through the network of nodes, every time the data packet 130 travels through a network node, that particular network node is added to the listing of network nodes. As such, the security signature 170 develops into unique key identifier for the data packet 130, much like a specific DNA sequence for a particular organism.

In one or more embodiments, the security signature portion 170 also contains timing information for at least one of the network nodes in the listing. The timing information indicates when the data packet 130 was received and/or transmitted by the network node(s). In addition, in at least one embodiment, the security signature portion 170 of the data packet 130 contains identifier information for at least one of the network nodes in the listing. Types of identifier information that may be used for the disclosed system include, but are not limited to, various types of biometric information and/or unique bit sequence identification codes for each of the network nodes.

Additionally, the security signature portion 170 of the data packet 130 includes geolocation information for at least one of the network nodes in the listing. The geolocation information includes the specific physical location of the network node and may also include indication as to whether the location of the network node is verified. In at least one embodiment, the geolocation information of a network node is verified by the network node receiving at least one authentication signal that is transmitted from at least one transmission source. A detailed description of how the location of a network node is verified by the use of an authentication signal(s) is discussed in the descriptions of FIGS. 3, 4, 5, and 6. In some embodiments, the geolocation information of a network node is verified by using ranging information that is obtained from signals that are transmitted to and from network nodes that are at verified locations. A detailed description of how the ranging information is obtained is described in the description of FIG. 2.

Figure 2:
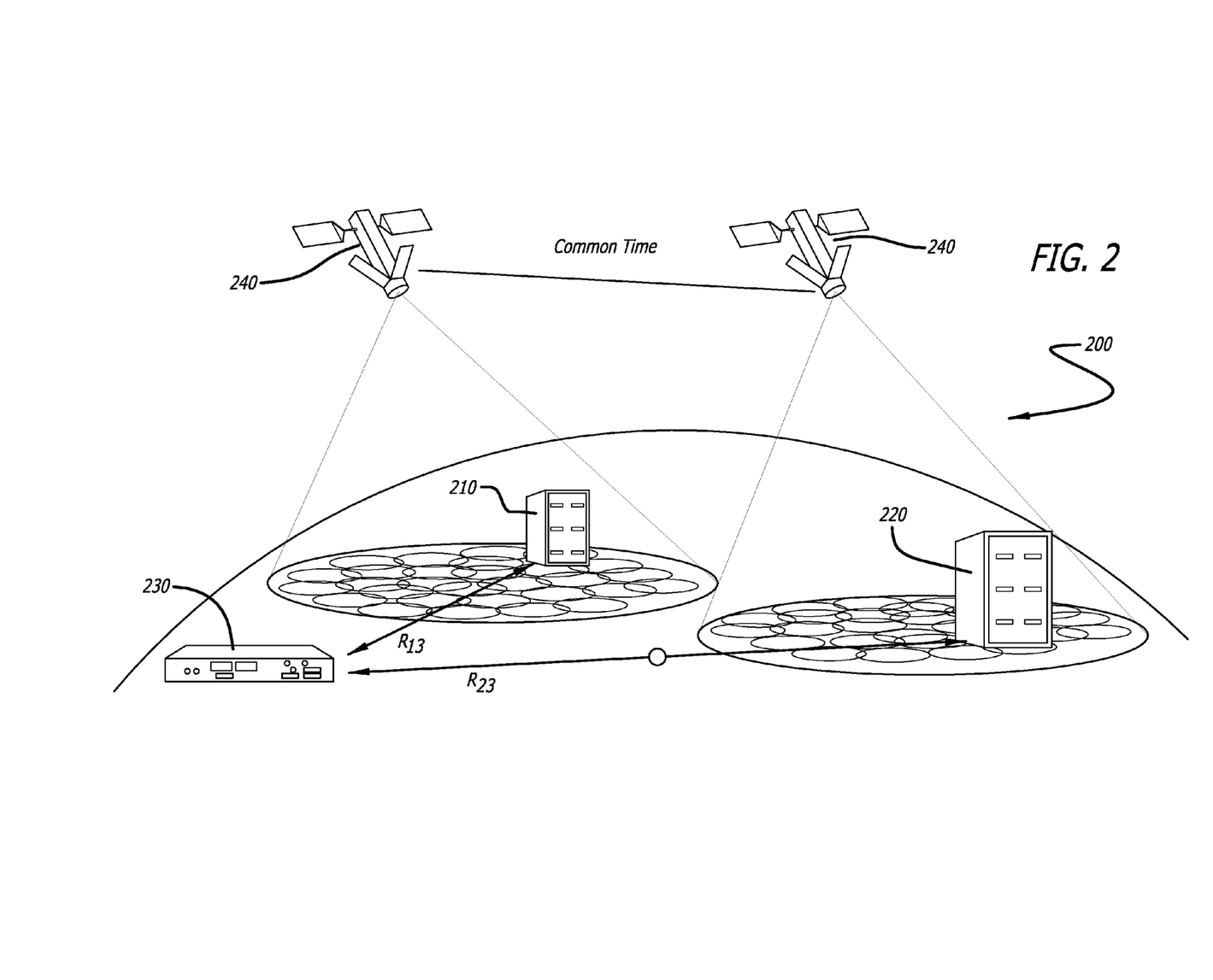
FIG. 2 illustrates the locations of three network nodes being verified by a transmission based authentication system and by the use of ranging information.

FIG. 2 illustrates the locations of three network nodes 210, 220, 230 being verified by a transmission based authentication system 200 and by the use of ranging information. In this figure, network nodes 210, 220 are router network nodes that are at verified locations. The locations of these network nodes 210, 220 are verified by the use of a transmission based authentication system 200 that employs satellites 240 to transmit at least one authentication signal. Refer to the discussions of FIGS. 3, 4, 5, and 6 for a detailed description of how the transmission based authentication system 200 operates. In this figure, the location of network node 230 is not verified by the transmission based authentication system 200 because network node 230 does not have satellite 240 access. However, the location of network node 230 can be verified by using ranging information through the use of round-trip time delays (i.e., ping delays) that are obtained by transmitting signals to and from network nodes 210, 220 that are at verified locations.

The process for obtaining ranging information for this example is as follows. First, network node 230 transmits a signal (R31) to network node 210 at time t1a. Network node 210 receives the signal (R31) at time t3a, and transmits a return signal (R13) to network node 230 at time t3b. Network node 230 receives the return signal (R13) at time t1b. The delay between network node 210 receiving the signal (R31) and replying with a signal (R13) (i.e. t3b−t3a) is know. As such, the round-trip delay (times the speed of light and divided by 2) gives the range between network node 210 and network node 230. This range information can then be used to verify the location of network node 230. Similar computation is used to calculate the range between network node 230 and network node 220. The related network range equations are:

$$R13=c[(t3a-t1a)+(t1b-t3b)]/2,$$

$$R23=c[(t3a-t2a)+(t2b-t3b)]/2,$$

where t is equal to time, and c is equal to the speed of light.

Figure 3:
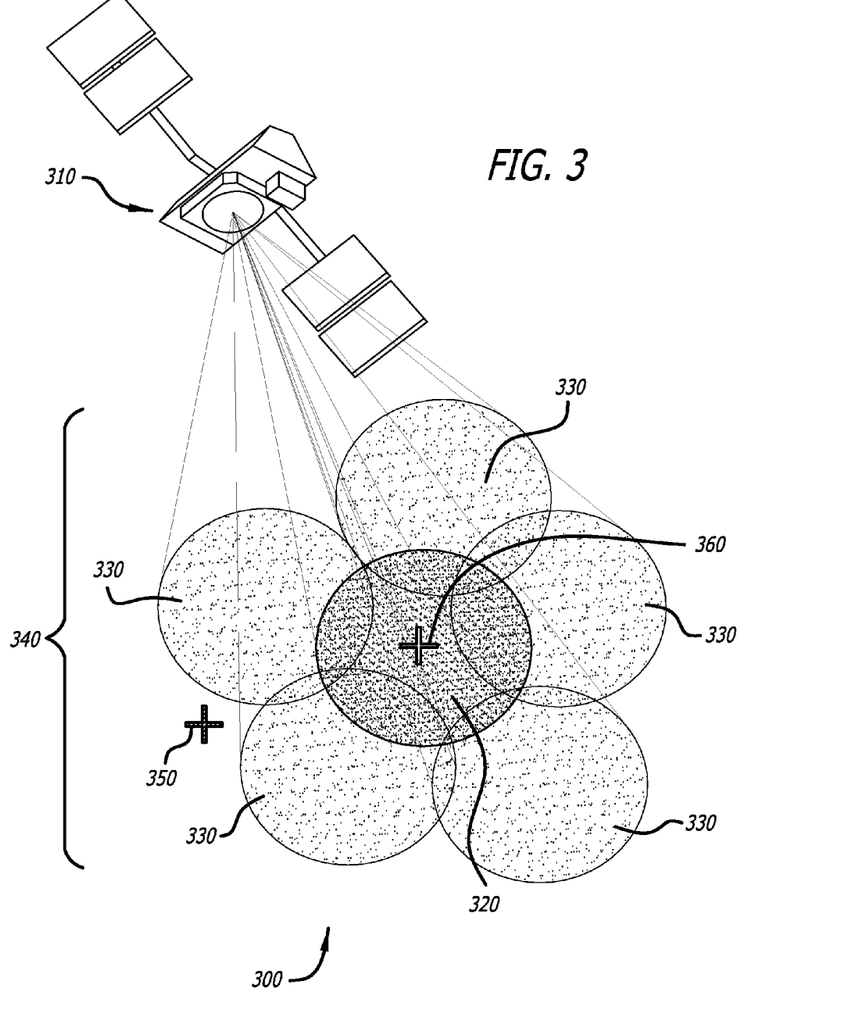
FIG. 3 illustrates an embodiment of the transmission-based authentication system employing a satellite to transmit an authentication beam along with multiple guard beams.

FIG. 3 illustrates an embodiment of a transmission-based authentication system 300 employing a satellite 310 that transmits overlapping spot beams 340 comprising an authentication beam 320, which may also be referred to as "beam zero," along with one or more guard beams 330. A legitimate network node 360 is shown to be located within the authentication beam 320. A deceptive network node 350 attempts to simulate the location of the legitimate network node 360.

Each location within the guard beams 330 and beam zero 320 receives unique authentication signals from each beam 340 over time. The locations within the regions where the beams 340 overlap receive composite authentication signals. The deceptive network node 350 is not located at the legitimate network node's 360 location and, thus, the deceptive network node 350 will not receive the particular authentication signal 320 that the legitimate network node 360 should receive due to its location. Unless a network node is at its legitimate location, the network node will not receive the correct authentication signal and, as such, an authenticator device cannot verify the location of the network node.

In one or more embodiments, the data transmitted in the spot beams 340 may include an authentication key and/or other pseudo-random code segment that may be used to distinguish data in one of the beams from data in the other beams. The disclosed systems and methods may use other distinguishing beam characteristics and/or data characteristics to distinguish the data between the beams 340. In at least one embodiment, the guard beams 330 may be transmitted at a higher power than beam zero 320 is transmitted. This will cause the signals from the guard beams 330 to shield the beam zero 320 authentication signal.

Figure 4A:
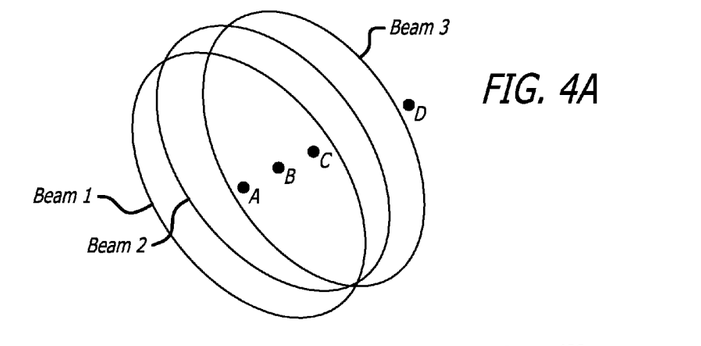
FIG. 4A illustrates an embodiment of a transmission-based authentication system having four network nodes located at various positions within and near three overlapping spot beams.

FIGS. 4A through 4F depict an embodiment where the signal received by one or more network nodes from multiple overlapping spot beams is used to authenticate the location and identity of one or more network nodes. The basic concept is that depending upon where the network nodes are located within the overlapping spot beam pattern, each network node will receive a different composite signal from the combination of signals transmitted from the multiple spot beams. In particular, FIG. 4A shows the disclosed transmission-based authentication system having, for example, four network nodes (i.e., A, B, C, and D) being located at various positions within and near three overlapping spot beams (i.e., Beam 1, Beam 2, and Beam 3). As such, this figure illustrates the overlapping spot beams illuminating the locations of network nodes A, B, and C. The location of network node D is shown to be just outside the beam pattern.

Figure 4B:
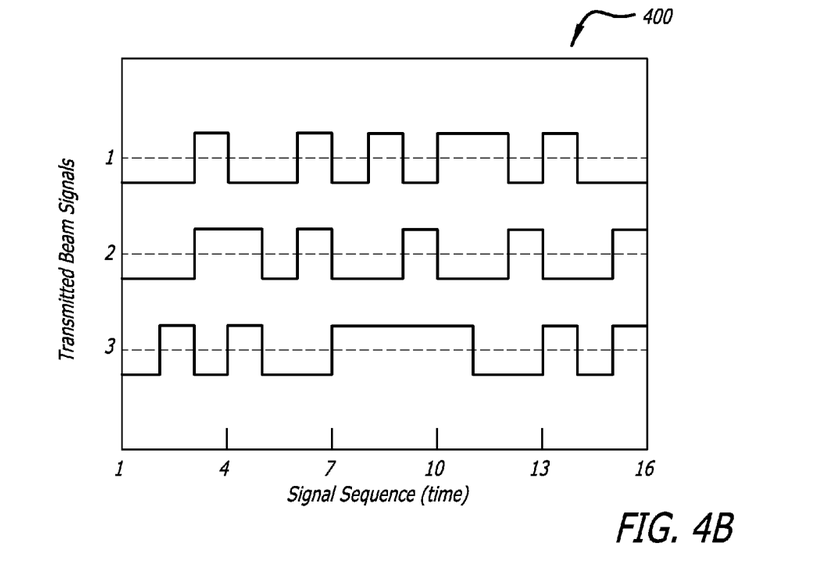
FIG. 4B illustrates an embodiment of a graph of signals transmitted by the three spot beams of FIG. 4A.

FIG. 4B illustrates a graph 400 showing exemplary signals (1, 2, and 3) that are transmitted by the three spot beams of FIG. 3A. In particular, this figure shows an exemplary set of signals that are transmitted by each spot beam (Beam 1, Beam 2, and Beam 3), and are used to verify the location of the network nodes. The three curves (indicated by 1, 2, and 3 on graph 400) show the bit sequence over time for the transmitted signals from each spot beam. These three bit sequences are only used to demonstrate the concept. As such, many other types of signals and forms of modulation may also be employed. The signal pattern may also be changed periodically to provide additional protection from deceptive network nodes and/or users and to provide a unique time for when a mobile network node is at a particular location. In addition, these signals that are used to authenticate a network node may be sent separate from a normal signal for brief periods during normal transmission or, alternatively, may be embedded within the normal signal.

Figure 4C:
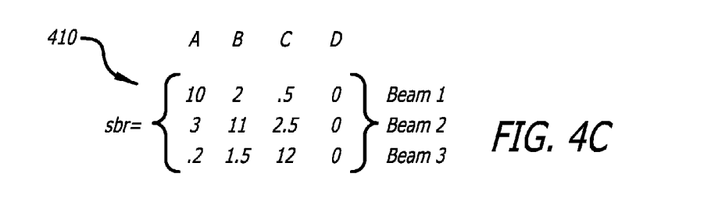
FIG. 4C illustrates an embodiment of an array of signal strengths of the three spot beams at the locations of the four network nodes of FIG. 4A.

FIG. 4C shows an array 410 of the signal strengths of the three spot beams (Beam 1, Beam 2, and Beam 3) at the locations of the four network nodes (A, B, C, and D) of FIG. 4A. In particular, the signal beam received (sbr) array 410 shows the signal strength received by each network node (A, B, C, and D) in the array 410 columns from the signal beam received (Beam 1, Beam 2, and Beam 3) in the rows of the array 410. For example, a network node at location B receives most of the signal from Beam 2, which has a signal strength of 11, compared to signal strengths 2 and 1.5 from Beams 1 and 3, respectively. The characteristics and/or properties of a network node's received signal may be the signature that is used to validate the network node's location.

Figure 4D:
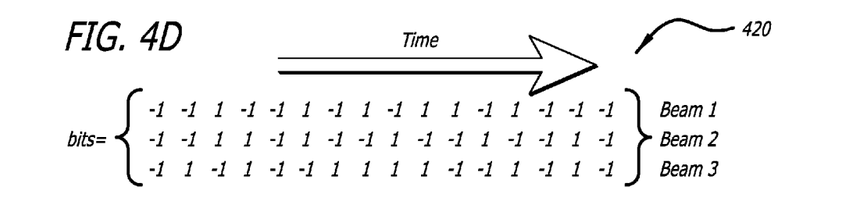
FIG. 4D illustrates an embodiment of an array of bits for the three spot beams of FIG. 4A.

FIG. 4D depicts an array 420 of bits for the three spot beams (Beam 1, Beam 2, and Beam 3) of FIG. 4A. In this figure, the bits array 420 shows the signal sequence transmitted by each beam (Beam 1, Beam 2, and Beam 3) in the three array rows, as a function of time, which is represented by the sixteen (16) columns of the array 420. Here, to illustrate the concept, the transmitted signals are binary. However, in alternate embodiments, other signal patterns may be employed.

Figure 4E:
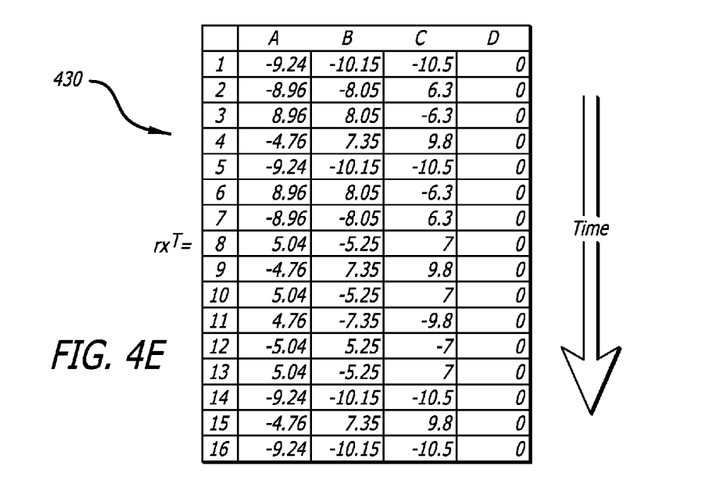
FIG. 4E illustrates an embodiment of an array of resultant signal sequences received by the four network nodes of FIG. 4A.

FIG. 4E illustrates an array 430 of the resultant signal sequences that are received by the four network nodes (A, B, C, and D) of FIG. 4A. This figure shows the resultant sequence of composite signals received by the network nodes at locations A, B, C, and D from the multiple overlapping beams. The resultant signal $(rx)=g \times (sbr^T) \times (bits)$, where g equals the gain of each network node receiver. In this example, gain (g) is chosen to be equal to 0.7 (i.e., g=0.7). The sixteen (16) rows of the received array (rx$^T$) 430 represent time steps, and the four (4) columns correspond to the different locations (A, B, C and D) of the network nodes. It should be noted that, in this example, the network node at location D receives no signal since this location is outside of the beam pattern.

Figure 4F:
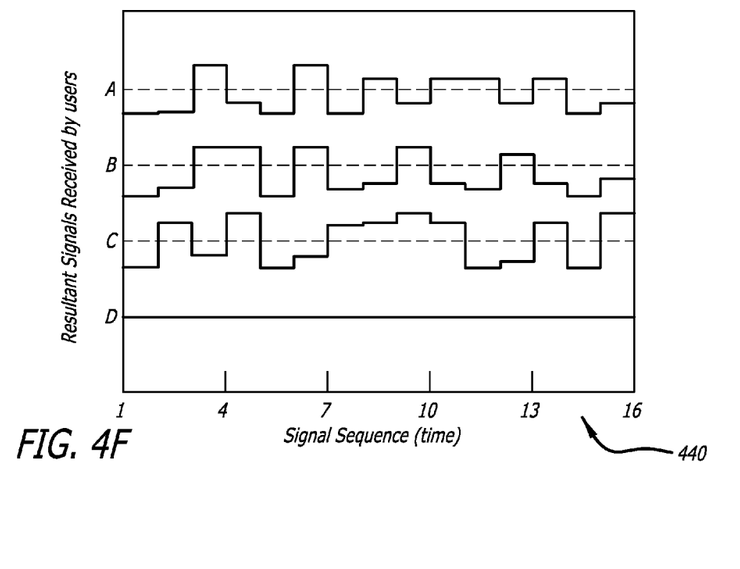
FIG. 4F illustrates an embodiment of a graph depicting resultant signals received by the four network nodes of FIG. 4A

FIG. 4F shows a graph 440 depicting the resultant signals that are received by the four network nodes (A, B, C, and D) of FIG. 4A. The four curves (indicated by A, B, C, and D) show the time sequence of the resultant signals that are received by network nodes at locations A, B, C, and D. The four resultant composite signals provide unique network node location identification for the four network nodes (A, B, C, and D), respectively.

Figure 5:
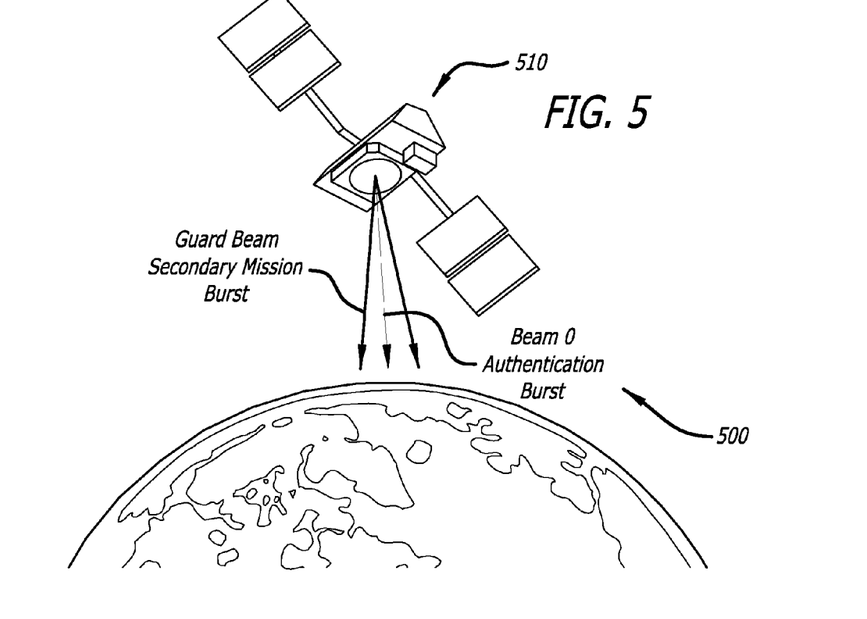
FIG. 5 illustrates an embodiment of a transmission-based authentication system using guard beam transmission as part of a secondary mission.

FIG. 5 illustrates an embodiment of the transmission-based authentication system 500 using guard beam transmission as part of a secondary mission. In this embodiment, at least one guard beam is used to transmit legitimate data as part of a secondary mission for the satellite 510. For example, a guard beam could be used to broadcast regional information, such as differential GPS network corrections that are valid in the guard beam footprint. However, it should be noted that for higher security this is not the preferred embodiment because the regional information is more likely to be able to be determined by a spoofer than a more random signal. As another example, the guard beam could be used to transmit data that is relevant to the primary mission (i.e., the authentication signal) and/or relevant to a secondary mission.

As shown in FIG. 5, the authentication signals may be transmitted in bursts. The authentication signals may be randomly sent in bursts, in beam zero or in alternating beams (including beam zero and guard beams), so that the timing of the authentication signals indicates the location of the network node. As such, if a network node receives multiple bursts, then the network node is located within beam zero or within a beam overlapping region.

In alternative embodiments, the authentication signals may be embedded in the normal data transmission in order to minimize their impact on satellite transmission power and/or bandwidth. The authentication signals may be embedded in the data transmission by various ways (e.g., time, frequency, polarization shifts, etc.) that do not impact normal reception, but are detectable by special processing.

In one or more embodiments, the authentication signals may be embedded in normal data transmission by varying broadcast power on a bit-by-bit basis. For these embodiments, the guard beam bit modulation changes the broadcast power of the transmitted bits on a bit-by-bit basis. This prevents a spoofer from attempting to observe the bits in their local guard beam, and processing the data to remove them.

For example, a spoofer makes a series of measurements (m):

95 105 105 −105 105 −105 95 −105 −95 −95

The spoofer might guess that the guard signal (g) was sign(m):

1 1 1 −1 1 −1 1 −1 −1 −1

And, the signal the spoofer is trying to access is sign(m−sign(m)*100):

−1 1 1 −1 1 −1 −1 −1 1 1

If instead of a fixed power signal, the guard beam broadcast power was modulated such that its component of the received signal was:

107 97 91 −93 99 −91 93 −107 −107 −101

Then, the signal the spoofer would receive would be:

102 102 96 −98 104 −96 88 −112 −102 −96

It would be much more difficult for the spoofer to try to figure out the authentication signal from that set of measurements.

In addition, it should be noted that an extension of that same idea would be to add a small random quadrature phase shift keying (QPSK) signal onto the guard band signal. For this case, the guard signal could still be used to transmit useful information.

Figure 6:
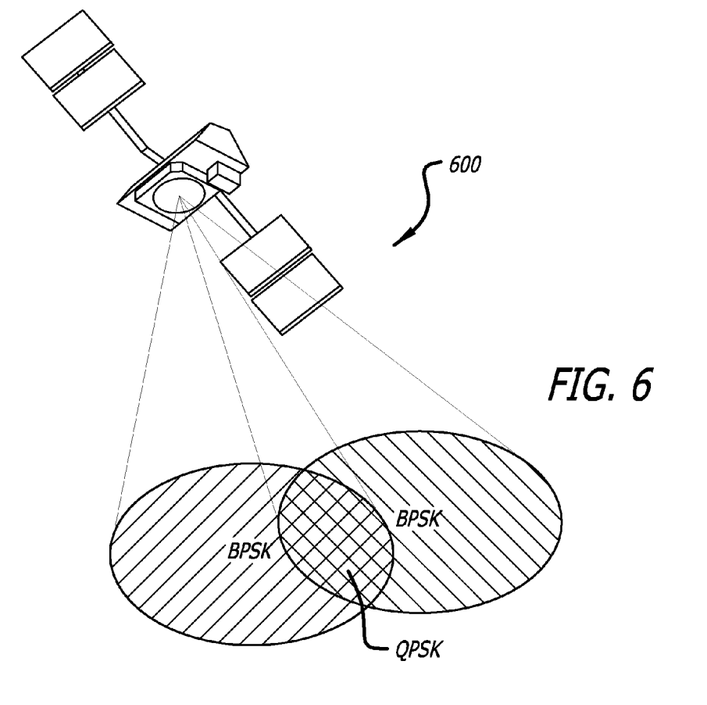
FIG. 6 illustrates an embodiment of a transmission-based authentication system employing out-of-phase binary phase shift keying (BPSK) guard beam transmission.

FIG. 6 shows the transmission-based authentication system 600 employing out-of-phase binary phase shift keying (BPSK) guard beam transmission. Specifically, in this figure, the guard beams transmit the authentication signal using out-of-phase BPSK signals between adjacent overlapping beams. The signal in the overlap region will then be a QPSK signal. The unique location of a network node within a beam can then be determined by analyzing the signal phasing and signal type that the network node receives.

In alternative embodiments, a secondary signal source may be used to provide additional shielding transmissions. For example, a second satellite could broadcast guard beams for the outside beams of a first satellite.

Figure 7:
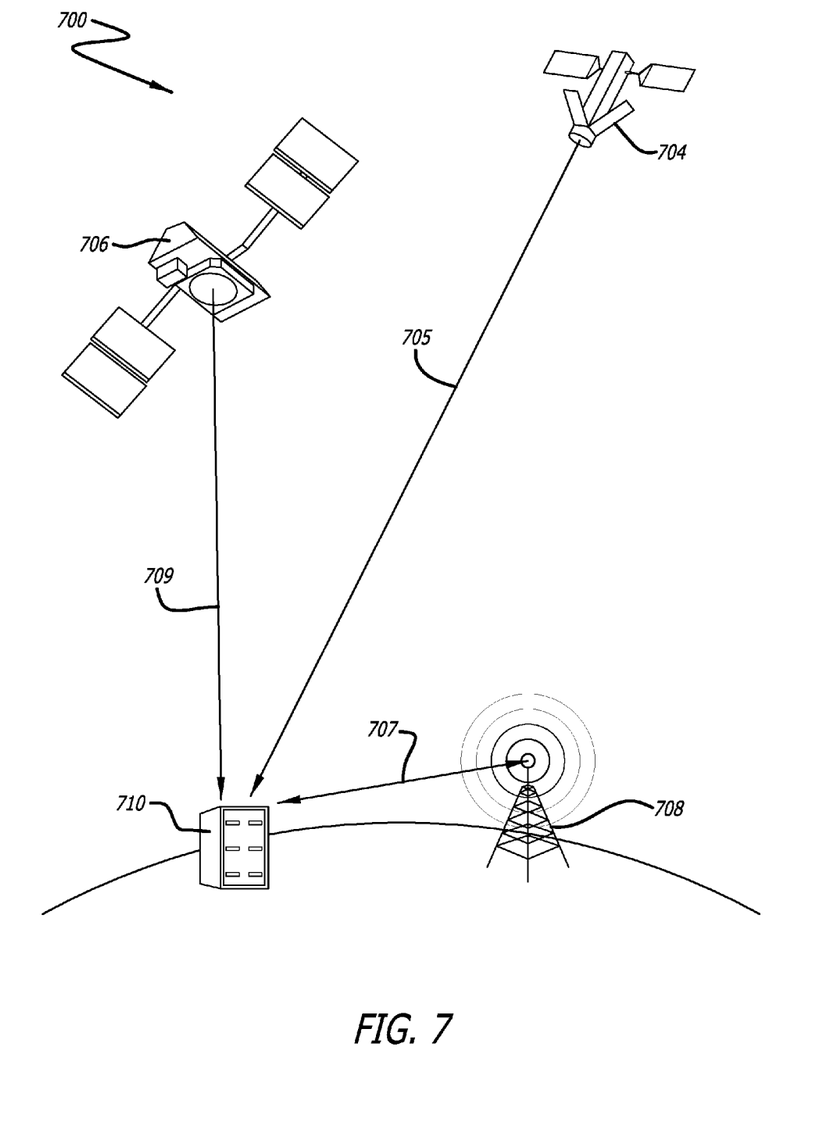
FIG. 7 illustrates an embodiment of the disclosed system having a network node that is able to perform in an occluded or jammed environment.

FIG. 7 illustrates an embodiment of the disclosed system 700 having a network node 710 that is able to perform in an occluded or jammed environment. In particular, FIG. 7 shows a network node 710 receiving RF signals 709, 705, 707 from two satellites 706, 704 and a cellular tower 708. In one example, the RF signals 709, 705, 707 are down-converted, sampled, optionally encrypted, and appended to security-enhanced data packets that are routed through the network node 710. In another example, data is extracted from the RF signals 709, 705, 707. The extracted data is optionally encrypted and appended to security-enhanced data packets that are routed through the network node 710. Examples of various types of RF signal sources that may be employed by the disclosed system include, but are not limited to, LEO satellites (e.g., Iridium satellites), GPS satellites (e.g., transmitting GNSS signals), and cellular towers.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for verifying network nodes in attenuated environments for cyber and network security applications, the system comprising:
   the network nodes, wherein the network nodes comprise:
      an origination network node;
      a destination network node; and
      at least one router network node;
   wherein the origination network node and the destination network node are connected to each other via the at least one router network node,
   wherein the origination network node is configured to transmit a data packet to the destination network node through the at least one router network node, and
   wherein the data packet contains a security signature portion, a routing data portion, and a payload data portion,
   wherein at least one of the network nodes receives at least one resultant signal from at least one transmission source, wherein the security signature portion comprises information that is obtained from the at least one resultant signal,
wherein the information is used to verify a location of at least one of the network nodes,
wherein the at least one transmission source is at least one of a satellite, a pseudo-satellite, and a terrestrial transmission source.

2. The system of claim 1, wherein the security signature portion comprises a digital signature.

3. The system of claim 1, wherein the security signature portion comprises a listing of at least one network node that the data packet travelled through from the origination network node to the destination network node.

4. The system of claim 3, wherein the security signature portion comprises timing information for the at least one network node in the listing indicating when the data packet was received by the at least one network node.

5. The system of claim 3, wherein the security signature portion comprises identifier information for the at least one network node in the listing.

6. The system of claim 5, wherein the identifier information is at least one of biometric information and a bit sequence identification code.

7. The system of claim 3, wherein the security signature portion comprises geolocation information for the at least one network node in the listing.

8. The system of claim 7, wherein the geolocation information is obtained by the network node receiving the resultant signal that is transmitted from the at least one transmission source,
wherein the resultant signal contains at least one authentication signal, and
wherein the network node location is verified by comparing properties of the resultant signal the network node receives to expected properties of the resultant signal that the network node should receive due to its location.

9. The system of claim 1, wherein the satellite is one of a low Earth orbiting (LEO) satellite, a medium Earth orbiting (MEO) satellite, and a geosynchronous Earth orbiting (GEO) satellite.

10. The system of claim 7, wherein the geolocation information is determined from ranging information obtained by a signal transmitted by the network node to another network node at a verified location and a signal received by the network node from the network node at the verified location.

11. The system of claim 1, wherein the routing data portion contains routing information for the data packet,
wherein the routing information includes information regarding the destination network node that the data packet is to be sent.

12. The system of claim 1, wherein the payload data portion includes data to be transmitted from the origination network node to the destination network node.

13. A method for verifying network nodes in attenuated environments for cyber and network security applications, the method comprising:
transmitting, with an origination network node, a data packet to a destination network node through at least one router network node,
wherein the origination network node and the destination network node are connected to each other via the at least one router network node,
wherein the network nodes comprise the origination network node, the destination network node, and the at least one router network node,
wherein the data packet contains a security signature portion, a routing data portion, and a payload data portion;
receiving, by at least one of the network nodes, at least one resultant signal from at least one transmission source,
wherein the security signature portion comprises information that is obtained from the at least one resultant signal; and
verifying, a location of at least one of the network nodes by using the information,
wherein the at least one transmission source is at least one of a satellite, a pseudo-satellite, and a terrestrial transmission source.

14. The method of claim 13, wherein the security signature portion comprises a listing of at least one network node that the data packet travelled through from the origination network node to the destination network node.

15. The method of claim 14, wherein the security signature portion comprises timing information for the at least one network node in the listing indicating when the data packet was received by the at least one network node.

16. The method of claim 14, wherein the security signature portion comprises identifier information for the at least one network node in the listing.

17. The method of claim 16, wherein the identifier information is at least one of biometric information and a bit sequence identification code.

18. The method of claim 14, wherein the security signature portion comprises geolocation information for the at least one of the network node in the listing.

19. The method of claim 18, wherein the geolocation information is obtained by the network node receiving the resultant signal that is transmitted from the at least one transmission source,
wherein the resultant signal contains at least one authentication signal, and
wherein the network node location is verified by comparing properties of the resultant signal the network node receives to expected properties of the resultant signal that the network node should receive due to its location.

20. The method of claim 13, wherein the satellite is one of a low Earth orbiting (LEO) satellite, a medium Earth orbiting (MEO) satellite, and a geosynchronous Earth orbiting (GEO) satellite.

21. The method of claim 18, wherein the geolocation information is determined from ranging information obtained by a signal transmitted by the network node to another network node at a verified location and a signal received by the network node from the network node at the verified location.

22. The method of claim 13, wherein the routing data portion contains routing information for the data packet,
wherein the routing information includes information regarding the destination network node that the data packet is to be sent.

23. The method of claim 13, wherein the payload data portion includes data to be transmitted from the origination network node to the destination network node.

24. A network node device for cyber and network security applications, the device comprising:
a receiver, wherein the receiver is to receive a signal from at least one signal source,
wherein the at least one signal source is at least one of a satellite, a pseudo-satellite, and a terrestrial transmission source; and
a processor, wherein the processor is to append information as a security signature onto data packets, which are routed through the network node device,
wherein the information is related to the signal, and
wherein the information is used to verify a location of the network node device.

25. An authentication system for cyber and network security applications, the system comprising:
- a network node device, wherein the network node device comprises:
- a receiver that is to receive a signal from at least one signal source, and
- a processor that is to append information as a security signature onto data packets, which are routed through the network node device,
- wherein the information is related to the signal,
- wherein the at least one signal source is at least one of a satellite, a pseudo-satellite, and a terrestrial transmission source; and
- a processing device, wherein the processing device is to authenticate the network node device when verifying a location of the network node device by using the information.

26. The system of claim 25, wherein authentication of the network node device is at least partly comprised of determining if the network node device is physically located in its anticipated geographic location.

27. The system of claim 25, wherein the network node device is authenticated before data is authorized to be passed.

28. The system of claim 25, wherein the processing device is one of a cell phone, a personal digital assistant (PDA), a personal computer, a computer node, an internet protocol (IP) node, a server, a Wi-Fi node, a tethered, and an untethered node.

* * * * *